J. P. ENGLISH & H. GORA.
POWDER CUTTING MACHINE.
APPLICATION FILED APR. 17, 1918.
1,279,678.
Patented Sept. 24, 1918.
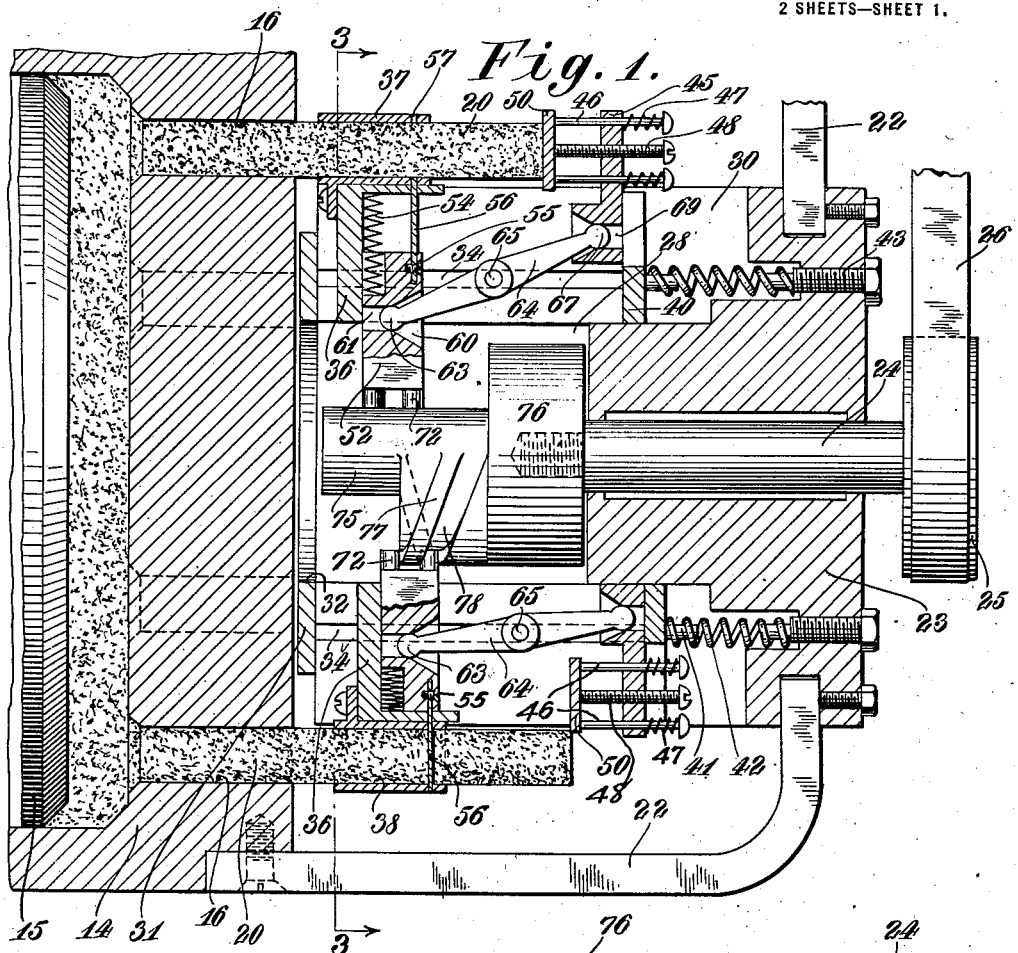
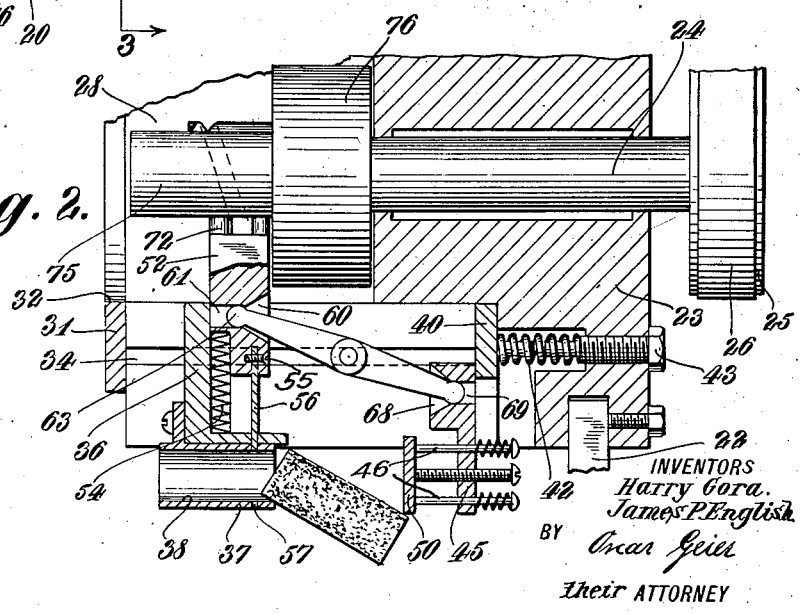
INVENTORS
Harry Gora.
James P. English.
BY Oscar Geier
Their ATTORNEY

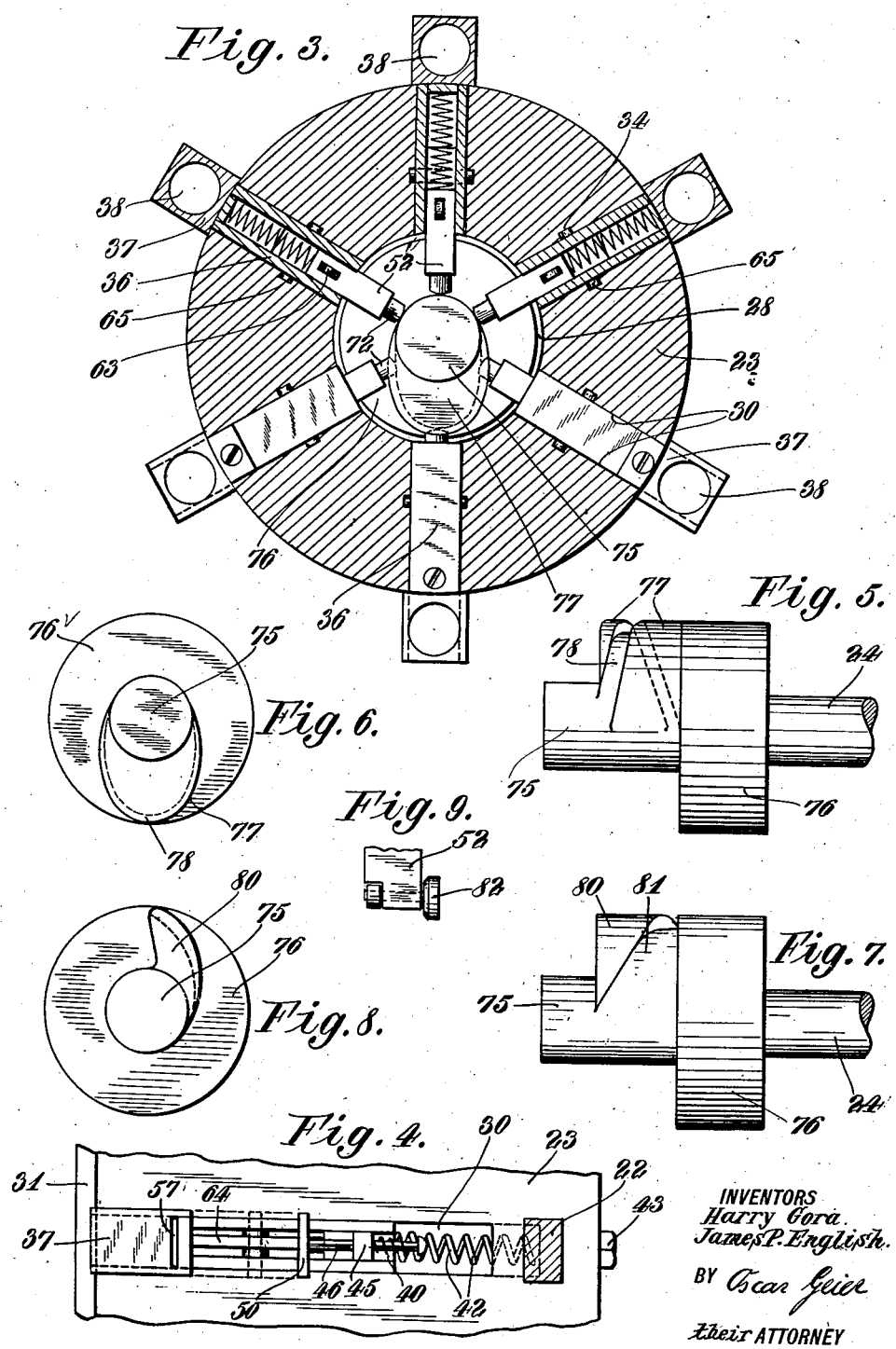

UNITED STATES PATENT OFFICE.

JAMES P. ENGLISH, OF PARLIN, AND HARRY GORA, OF JERSEY CITY, NEW JERSEY.

POWDER-CUTTING MACHINE.

1,279,678.   Specification of Letters Patent.   Patented Sept. 24, 1918.

Application filed April 17, 1918. Serial No. 229,050.

*To all whom it may concern:*

Be it known that I, JAMES P. ENGLISH, a citizen of the United States, residing at Parlin, county of Middlesex, and State of New Jersey, and I, HARRY GORA, a citizen of Russia, residing at Jersey City, county of Hudson, and State of New Jersey, have invented certain new and useful Improvements in Powder-Cutting Machines, of which the following is a specification.

This invention relates to improvements in means for cutting smokeless powder or like semi-plastics into definite lengths as the same is extruded from a reservoir or the powder making machine direct.

The principal object of the invention is to provide a mechanism which may be accurately adjusted to cut off predetermined lengths of the powder rods in a safe and expeditious manner.

A further object is to provide means whereby the length and weight of each stick can be accurately adjusted, the machine being capable of working upon a plurality of the extruded rods simultaneously.

This and other objects are attained by the novel construction and combination of parts hereinafter described and shown in the accompanying drawings, forming a material part of this disclosure, and in which:—

Figure 1 is a fragmentary vertical sectional view taken substantially on the center line of a machine made in accordance with the invention.

Fig. 2 is a similar view of the same, the parts being shown in another position.

Fig. 3 is a transverse sectional view taken on line 3—3 of Fig. 1.

Fig. 4 is a partial plan view looking downward on the parts shown in Fig. 1.

Fig. 5 is a side elevational view showing the preferred form of operating cam used in the mechanism.

Fig. 6 is an end view thereof.

Fig. 7 is a similar side elevational view showing a modified form of cam.

Fig. 8 is an end view thereof, and

Fig. 9 is a fragmentary view indicating the roller used in connection with the cam shown in Figs. 7 and 8.

In Fig. 1 of the drawing, the numeral 14, designates the front end or head of a stationary cylinder, in which operates a plunger 15, compressing the powder, when in a semi-plastic condition, forcing the same outwardly through a plurality of openings 16 formed in the head 14, the same issuing in the form of cylindrical sticks 20, which, due to their plastic condition, extend in a relatively rigid manner.

Engaged with the head 14, by support arms 22 is a circular block 23, and journaled axially therein is a spindle 24, driven by a pulley 25, rotated by a belt 26 from any convenient source of power.

Formed in the inner end of the block 23 is a circular opening 28, and extending into the opening are a plurality of rectangular recesses 30 partially covered at their ends by a plate 31 containing a central opening 32 equivalent in diameter to the circular opening 28, and formed in the sides of the recesses 30, are opposed slots 34.

Slidable in the recesses 30 are carriages comprised of blocks 36 to which are attached square blocks 37 containing cylindrical openings 38, which are alined in register with the openings 16 formed in the head 14, thus permitting the extruded powder sticks to extend directly through.

The opposite ends 40 of the carriages have fixed in their outer surfaces pins 41, surrounded by helical coiled compression springs 42, adjustable by screws 43, the heads of which extend outward beyond the block 23. Mounted to slide transversely of the recesses 30, upon the inner sides of the elements 40, are blocks 45, carrying slidable pins 46 surrounded by coiled compression springs 47, opposed to the screws 48, which abut against the stop plates 50 in which the pins 46 are secured.

Thus the powder sticks extruded through the head 14, and passing through the cylindrical guides 38, make contact with the faces of the stop plates 50, forcing the carriages outwardly. Slidable transversely upon the inner surfaces of the carriage block elements 36, are other blocks 52, the same passing through the recesses 30, into the central opening 28 and are pressed inward by the coiled compression springs 54, which abut at their outer ends against portions of the blocks 37, the inner ends of the springs resting in recesses formed in the blocks 52.

Engaged by the screws 55, to the blocks 52 are cutters 56, the same being adapted to pass transversely across the cylindrical openings 38, outlets 57 being provided opposite to the cutters, so that a small portion of the powder, pressed forward by the cutters may be extruded.

Formed in the inner faces of the blocks 52, are conical openings 60, terminating in cylindrical passages 61 which extend completely through the blocks, and engaged within the openings are the spherical ends 63 of levers 64, pivoted upon pins 65, operable within the recesses 34, the opposite ends of the levers have similar spherical ends 67, operatively engaged within conical openings 68, formed in the sliding blocks 45, and terminating in cylindrical passages 69.

Thus as the blocks 52 are moved radially, a corresponding but opposite movement is given to the blocks 45, so that the same are withdrawn from contact with the end of the powder stick 20, as the cutters 64 are transversed thereacross, severing the same, permitting the blocks to drop into a container suitably arranged below the apparatus.

Extending radially inward from the lower ends of the sliding blocks 52, are pairs of pins 72, pressed toward the center, due to the effect of the springs 54, and resting upon the extending end 75 of a cam rigidly engaged with the spindle 24, the cam having a main cylindrical part 76 and a single raised oval loop 77, containing a helical groove 78, starting upon the surface 75 at zero and adapted to engage between the pins 72 at such time as a stick of powder has moved the block element outwardly into position for engagement, so that the starting point of the cam will enter between the pins. The angularity or pitch of the cam slot is made in accordance with the delivery of the powder, so that the carriages carrying the cylindrical guides and cutters are moved outwardly toward the front of the machine simultaneously with the advancement of the powder sticks.

In the form shown in Figs. 7 to 9 inclusive, a slightly different shape of cam is used, the same having a single raised element 80 containing a slot 81, adapted to engage with a roller 82 mounted upon the block 52 in an obvious manner.

In all other respects the construction is as before described.

In operation, the spindle 24 being actuated, and the powder sticks 20 expelled from the head 14, due to the pressure of the plunger 15, the powder will be extruded in the form of cylindrical rods, passing readily into the openings 38 until contact is made with the stop plate 50, moving the carriage along the slideway-recesses 30, toward the outer end of the machine until the cam has picked up the pins and moved the block 52, together with the cutter so as to sever the powder, the stop plate 50 being retracted by action of the lever 64, and should the severed portions of the powder sticks adhere to the tubular guides they will be removed by contact with the stop plates as indicated in Fig. 2.

It is to be noticed that all of the several operations are continuous and automatic and that adjustment of the stop plate 50 may be accurately made so that the weight of the powder stick cut off may be adjusted to a nicety.

It will also be apparent, that due to the several openings through which the powder is extruded, that the work is performed in an expeditious manner, and with entire safety to the operator.

Having thus described our invention what we claim as new and desire to secure by Letters Patent, is—

1. In a powder cutting machine, the combination with a head having fixed cylindrical open guides adapted to receive the powder in a semi-plastic condition, and means for projecting the powder therethrough, of stop plates engageable with the extruded ends of the powder sticks, a carriage upon which said plates are mounted, a cutter fixed transversely of said guides, a block upon which said guide is mounted, a rotating cam, means formed with said block adapted to make contact with said cam, and a lever hinged between said block and said stop plate whereby said cutter and said stop plate are moved simultaneously in opposite directions.

2. In a powder cutting machine, the combination with a cylindrical fixed head containing longitudinal recesses in its periphery, a plate fixed to the outer end of said recesses, carriages slidably mounted in said recesses, said carriages containing fixed guides for receiving powder and stop plates against which the powder is adapted to make contact, of means for adjusting said stop plates, cutters movable transversely through said guides, carriers for said cutters, other carriers for said stop plates, connections between said carriers whereby they are moved in opposite directions simultaneously, a cam rotatably mounted centrally of said cylindrical head, and means formed on the inner end of said first carriers engageable with said cam whereby said cutter carriers are forced outwardly and said stop plates moved inwardly.

3. A powder cutting machine having a fixed cylindrical head, and containing a plurality of longitudinal recesses in its periphery, carriages slidably engaged within said recesses, resilient means for forcing said carriages toward one end of said head, a plate limiting the movement of said carriages, cylindrical guides receptive of the powder to be cut fixed on said carriages, stop plates against which said powder is adapted to make contact, whereby said carriage may be moved away from said limiting plate, cutters mounted to pass transversely through said guides, holders for said cutter operable in said carriages, supports for said stop plates slidable transversely in said carriages, levers pivoted in longitudinal slots formed in the lateral sides of said recesses, said levers connecting with said cutter holders at one end and with said stop plates at the other, so as to move the same in opposite directions, and a cam centrally mounted in said block adapted to move said cutter holders outwardly.

4. In a powder cutting machine, the combination with a reservoir adapted to contain powder in a plastic form, a plunger operable therein, and a plurality of cylindrical openings formed through the head of said reservoir, of a cylindrical block rigidly engaged with said head, a spindle rotatable therein, means for driving said spindle, a cam carried by said spindle within a central opening in said block, a plurality of carriages slidably mounted in said block, tubular guides carried by said carriages, said tubular guides registering with the openings in said reservoir head, means contactable with the ends of the extruded powder, whereby said carriages are given an initial movement, blocks mounted to move transversely in said carriages, cutters carried by said blocks adapted to pass transversely through said guides, springs normally pressing said blocks into engagement with said cam, and a pair of pins affixed to the lower side of said block engageable with the profile of said cam, whereby said cutters are caused to operate.

In testimony whereof we have affixed our signatures.

JAMES P. ENGLISH.
HARRY GORA.